Aug. 25, 1931.    F. HENRARD    1,820,800
METHOD OF STRAINING MILK AND A STRAINER FOR SEPARATING MACHINES
Filed Oct. 4, 1929
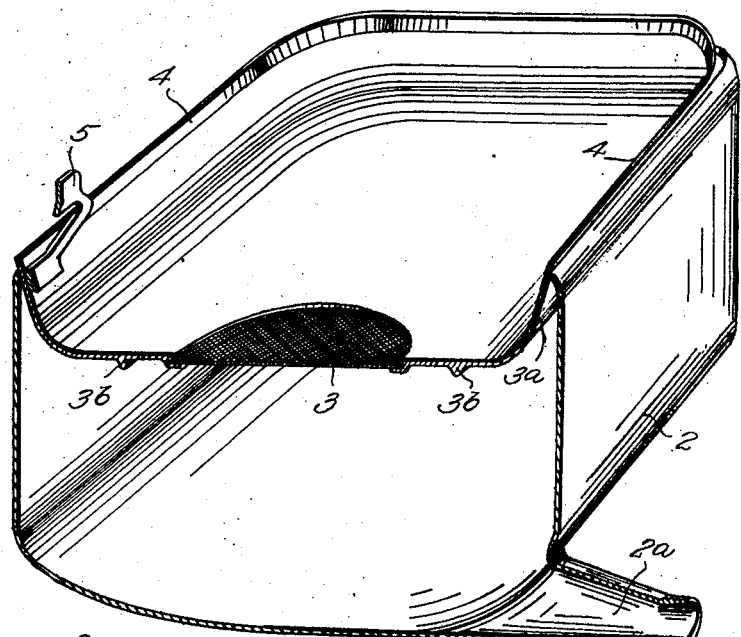
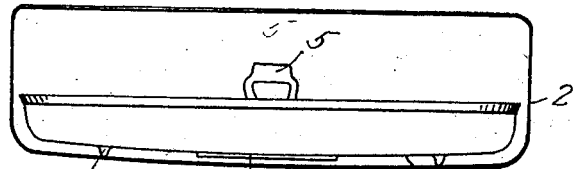
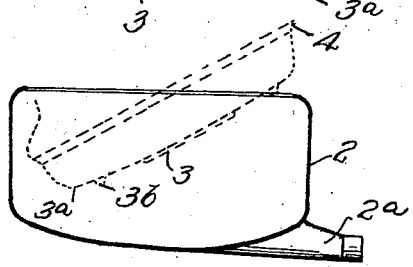

Patented Aug. 25, 1931

1,820,800

UNITED STATES PATENT OFFICE

FERNAND HENRARD, OF BRUSSELS, BELGIUM, ASSIGNOR TO SOCIETE ANONYME ECREMEUSES MELOTTE, OF REMICOURT, BELGIUM

METHOD OF STRAINING MILK AND A STRAINER FOR SEPARATING MACHINES

Application filed October 4, 1929, Serial No. 397,289, and in Belgium March 1, 1929.

In existing separating machines for milk, it is known to strain the milk either before the latter is poured into the reservoir of the separator or at the actual moment of pouring it in.

The object of this straining is to separate any impurities from the milk.

In the case of whey it is known generally that, as a consequence of the previous treatments it has undergone, it is emulsified and that a deposit of froth is formed in the reservoir even after straining, which froth is very difficult to remove. This froth is not retained by any screen.

The object of the invention is to remove this disadvantage by arranging the strainer, in the case of whey, at the bottom of the reservoir in such a way that the froth formed by the momentary standing of the emulsified milk is formed above said strainer.

In the case of a non-emulsified milk (good milk) the strainer may be placed at the upper part of the reservoir of the separator.

According to the invention, the strainer proper is placed at the lower part of a container having solid walls. This container has one of its dimensions (length or width) smaller than that of the corresponding part of the reservoir of the separator so as to be capable of being placed either at the upper part of the latter or in the base by partly swinging the said container.

The accompanying drawings illustrate by way of example and in a non-limiting manner one embodiment of the invention; the latter including the various features which the arrangement illustrated comprises.

Figure 1 is a perspective view with parts in section of a separator reservoir and a strainer according to the invention.

Figures 2 and 3 are diagrammatic views in which the container is shown at the lower part of the reservoir and in its position of engagement respectively.

The separator reservoir 2, generally situated at the upper part of the separator, is provided with a duct 2a which permits the strained milk to flow towards the turbine.

The strainer 3, located at the lower part of the solid-walled container 3a, may be situated at the upper part of the said reservoir 2 by means of flanges 4 with which the said container is provided.

In order to be placed at the bottom of the reservoir 2 (Figure 2) the said container is partly swung (position shown in dotted lines in Figure 3) and bears against the reservoir by means of feet 3b of small height. This insertion into the reservoir is rendered possible on account of the difference in length between the reservoir proper and the container 3a.

It goes without saying that the container may rest directly upon the base of the reservoir if the feet 3b are dispensed with.

A handle 5 is provided upon the said container so as to permit the latter to be removed easily.

In the case when whey is being strained, the froth which is formed remains practically entirely in the container 3a. By simply removing the container, the whole of the froth formed can be withdrawn.

What I claim is:

1. A device for straining emulsified milk before being poured into the reservoir of a separator, embodying a receptacle comprising a sieve or strainer, itself serving as the bottom; the external dimensions of said receptacle being substantially the same as those of the reservoir, and one of said dimensions being smaller than the corresponding one of the reservoir to enable, by partially swinging the receptacle, its introduction into the reservoir or its withdrawal therefrom.

2. A device for straining emulsified milk before being poured into the reservoir of a separator, embodying a receptacle comprising a sieve or strainer, itself serving as the bottom, and a handle to enable the removal of the receptacle by hand; the external dimensions of said receptacle being substantially the same as those of the reservoir, and one of said dimensions being smaller than the corresponding one of the reservoir to enable, by partially swinging the receptacle, its introduction into the reservoir or its withdrawal therefrom.

3. A device for straining emulsified milk before being poured into the reservoir of a separator, embodying a receptacle comprising a sieve or strainer, itself serving as the bottom, a handle to enable the removal of the receptacle by hand, and a flange at the side edges, whereby it can be placed at the upper part of the reservoir by resting on in-curved edges which extend toward the interior of the reservoir of the separator; the external dimensions of said receptacle being substantially the same as those of the reservoir, and one of said dimensions being smaller than the corresponding one of the reservoir to enable, by partially swinging the receptacle, its introduction into the reservoir or its withdrawal therefrom.

In testimony whereof I have affixed my signature.

FERNAND HENRARD.